March 11, 1952 E. L. MAYO 2,588,862

UNIVERSAL MOUNTING FRAME FOR USE WITH TELEPHONES

Filed Dec. 18, 1947 2 SHEETS—SHEET 1

Inventor:
Edward L. Mayo

By Brown, Jackson, Boettcher & Dienner.

Attys.

March 11, 1952 E. L. MAYO 2,588,862

UNIVERSAL MOUNTING FRAME FOR USE WITH TELEPHONES

Filed Dec. 18, 1947 2 SHEETS—SHEET 2

Inventor:
Edward L. Mayo

By Brown, Jackson, Boettcher & Dienner.

Attys.

Patented Mar. 11, 1952

2,588,862

UNITED STATES PATENT OFFICE 2,588,862

UNIVERSAL MOUNTING FRAME FOR USE WITH TELEPHONES

Edward L. Mayo, Cleveland, Ohio, assignor to Teledex, Inc., New York, N. Y., a corporation of New York Application December 18, 1947, Serial No. 792,579

1 Claim. (Cl. 248—346)

This invention relates to means for mounting attachments on telephones, and has to do with a frame structure adaptable to the bases of various types of telephone instruments and adapted for reception of an attachment mounted thereon.

There are presently in use desk or table telephones which may be placed in four different classes, in respect to the bases thereof. Such instruments may be classified as follows—oval base, round base, rectangular or oblong base, and rectangular or oblong base with bush buttons. It frequently is desirable to mount on the base of a telephone a memorandum device by means of which frequently used telephone numbers, or other memoranda frequently used in connection with the telephone, is rendered readily available. It is not permissible to alter the base of the telephone instrument itself for mounting thereon of an index or memorandum receiving device, nor in some cases would that be practicable. Due to the various shapes and sizes of the bases of the telephone instruments above referred to, a mounting frame structure to be applied to the base of a telephone should, for practical purposes, be readily adaptable to telephone bases of different shapes and sizes such as those above referred to. Also, the mounting frame or attachment should be of such a character as to avoid any objectionable projections beyond the base of the telephone.

My invention is directed to a frame stucture suitable for mounting on the bases of telephone instruments of the various types above mentioned. To that end, I provide a two part frame adjustable to engage about bases of different widths, this frame having associated therewith means for clamping it to the base of the telephone and being provided with indicating means whereby the frame may be adjusted for a given telephone base. Further, the frame structure of my invention is provided with supporting pads disposed to support adequately the telephone instrument, when applied to a telephone base not provided with supporting pads, the pads of the mounting frame and the portions of the latter carrying such pads being so disposed as to avoid interference with the supporting pads on the base of a telephone instrument provided with spaced supporting pads or cushions. Further objects and advantages of my invention will appear from the detail description.

Figure 5:
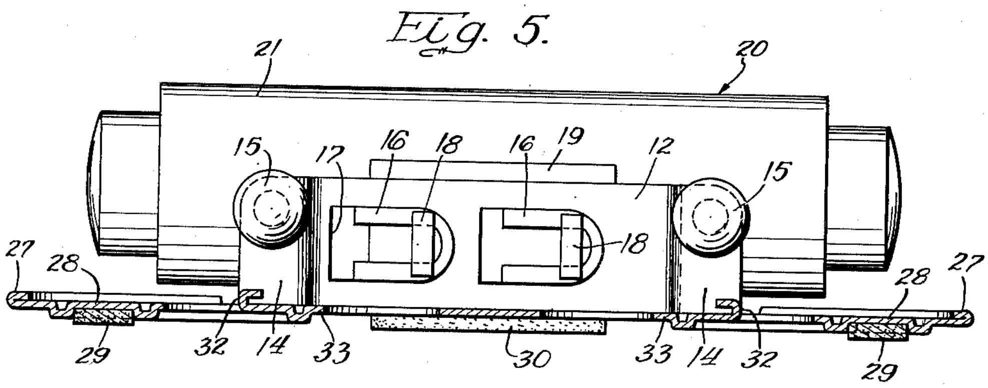
Figure 5 is a sectional view, on an enlarged scale, taken substantially on line 5—5 of Figure 3.
Figure 6:
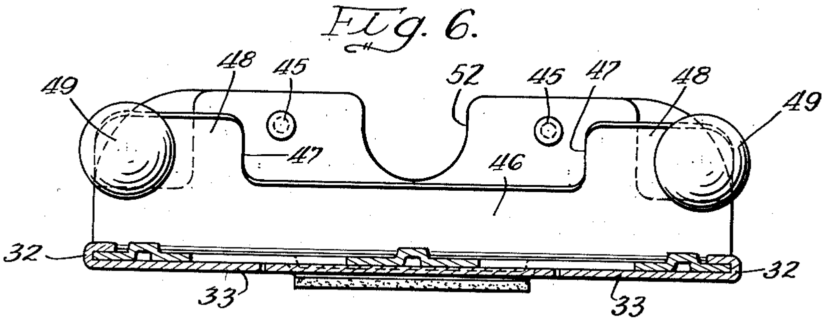
Figure 6 is a sectional view, on an enlarged scale, taken substantially on line 6—6 of Figure 3.
Figure 7:
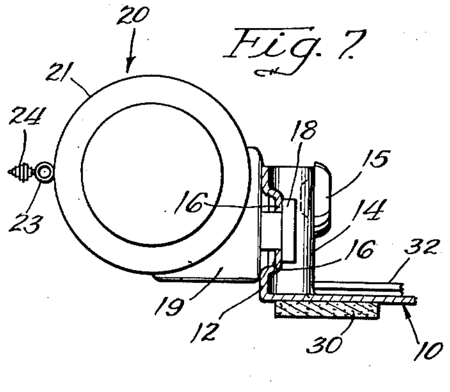
Figure 7 is a fragmentary sectional view, on an enlarged scale, taken substantially on line 7—7 of Figure 3, certain parts shown in elevation.
Figure 8:
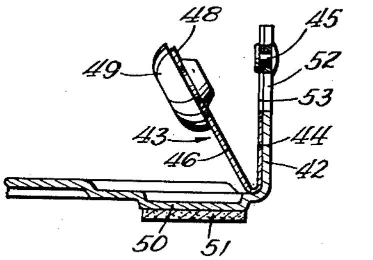
Figure 8 is a sectional view, on an enlarged scale, taken substantially on line 8—8 of Figure 3, certain parts being broken away and shown in section.

The mounting frame of my invention comprises a lower frame member 10 and an upper frame member 11, both of oblong shape in plan, slidably connected for adjusting the effective length of the frame. The lower frame member 10 is formed of sheet metal, preferably aluminum, of suitable gauge, and is of open work construction for lightness. The frame member 10 is provided, at its outer or forward end, with an upwardly extending integral flange 12 shaped at its side portions to provide rearwardly extending flanges 13 and clamping elements 14, of slight width relative to flange 12, projecting outward from the supplementary flanges 13. The width of clamping elements 14 may vary from approximately one fourth to one seventh of the width of flange 12. Accordingly, the definition of clamping elements 14 as of slight width relative to flange 12 includes the limits stated. As is shown more clearly in Figure 3, the flanges 13 diverge slightly rearward and are connected to the clamping elements 14 by well rounded corners or fillets. Preferably, each of the elements 14 has mounted thereon a bumper 15 formed of a suitable soft friction material, such as rubber. The flange 12 is provided with two elements 16 pressed rearward therefrom and inclined toward one side of frame member 10. Each of the elements 16 is provided with a keyhole slot 17 therein, as appears more fully in Figure 5. The slots 17 are adapted for reception of T-shaped securing elements 18 carried by a block 19 of an attachment 20. This attachment 20 may be of any suitable type and is shown, by way of example, as comprising a cylinder 21 containing a reel and associated parts (not shown), and a fabric ribbon or strip 22 passing through a slot in cylinder 21 and windable onto and off of the reel. Conveniently, a cross rod 23, formed of metal, is clamped onto the outer end of strip 22 and is provided with a gripping element or knob 24. The rod 23 projects a short distance beyond the side edges of strip 22 and provides stop means for limiting movement of strip 22 inward of cylinder 21. As will be understood, the strip 22 is intended for reception of telephone numbers or other memoranda intended for use in connection with the telephone instrument. As will be understood, the attachment 20 may be any suitable device which it is desired to mount on a telephone.

The frame member 10 is provided, at each side thereof, and a substantial distance rearward from flange 12, with an outwardly extending arm 26 of substantial width and length disposed in the plane of the body portion of frame member 10 and provided with a peripheral stiffening flange 27. Preferably, frame 10, including the arms 26, has suitable reinforcing elements or ribs pressed therein, as shown, and each of the arms 26 also has pressed therein a downwardly opening recess or pocket 28 of generally oblong shape. The pockets 28 have secured therein pads 29 of suitable material, such as rubber or a cork composition, and a similar pad 30 is secured to the under face of frame member 10 adjacent the front thereof. The frame member 10 is further provided, at each side thereof, with integral elements 32 defining, with the base or body portion 33 of frame member 10, channel elements for slidably mounting the upper frame member 11 on frame member 10, as will appear more fully presently. The frame member 10 is also provided, in the body or base 33 thereof, with spaced pairs of slots 34, the front pair of slots being designated "O," the next pair of slots being designated "R," these two pairs of slots being adjacent, the third pair of slots, located somewhat rearward beyond the mid-length of frame member 10, being designated "S," and the rear most pair of slots being designated "P." The purpose of the slots 34 and the designations therefor will be described more fully later.

The upper frame member 11 is of generally oblong shape and also preferably is formed of sheet aluminum and is provided with lengthwise stiffening elements or ribs pressed therefrom. At its forward end the frame member 11 is provided with a rectangular notch 36 and with an indicator point 37 at each side of the notch 36. The frame member 11 is also provided, adjacent each side of notch 36 and a short distance outward from the indicator point 37, with a slot 38, there being two slots 38 disposed to be brought into register with the slots 34 of the respective pairs of slots in frame member 10, selectively. The side edge portions of frame member 11 extend into the channel elements at the sides of frame member 10, providing therewith slidable connection between the two frame members 10 and 11 for relative adjustment thereof. The slots 34 and the slots 38, when in register with a selected pair of slots 34, are adapted for reception of suitable fastening devices 40, which conveniently may be two pronged brass fasteners commonly used for fastening together sheets of paper. Any suitable devices may be used and, as will be clear from Figures 3 and 4, when the fasteners 40 are in position the two frame members are secured against relative lengthwise movement.

The frame member 11 is provided, at its rearward end, with an integral upwardly extending flange 42. A spring clamp member 43, of generally V shape in cross section, is disposed with its rearward arm 44 seating on the forward face of flange 42 and secured thereto in a suitable manner, conveniently by means of rivets 45. The inner arm 46 of member 43 is provided with an elongated notch 47 extending a substantial distance downward from its upper edge and with two upwardly extending clamp elements 48. Bumpers 49, formed of soft friction material such as rubber, are mounted on the clamp elements 48 at the inner or forward faces thereof. It will be noted that the inner arm 46 of member 43, which preferably is formed of spring steel, extends upward and forward from flange 42 at a considerable inclination thereto. The frame member 11 is also provided, adjacent flange 42 thereof, with a downwardly pressed area 50 of generally oblong shape. A supporting pad 51 conveniently formed of cork or of a cork composition, is secured to the underface of area 50. The underface of pad 51 is disposed in the same plane as the underfaces of the pads 29 and 30, providing therewith a four point support for the mounting frame structure comprising the frame members 10 and 11, as will be explained more fully presently.

Figures 1, 2, 3:
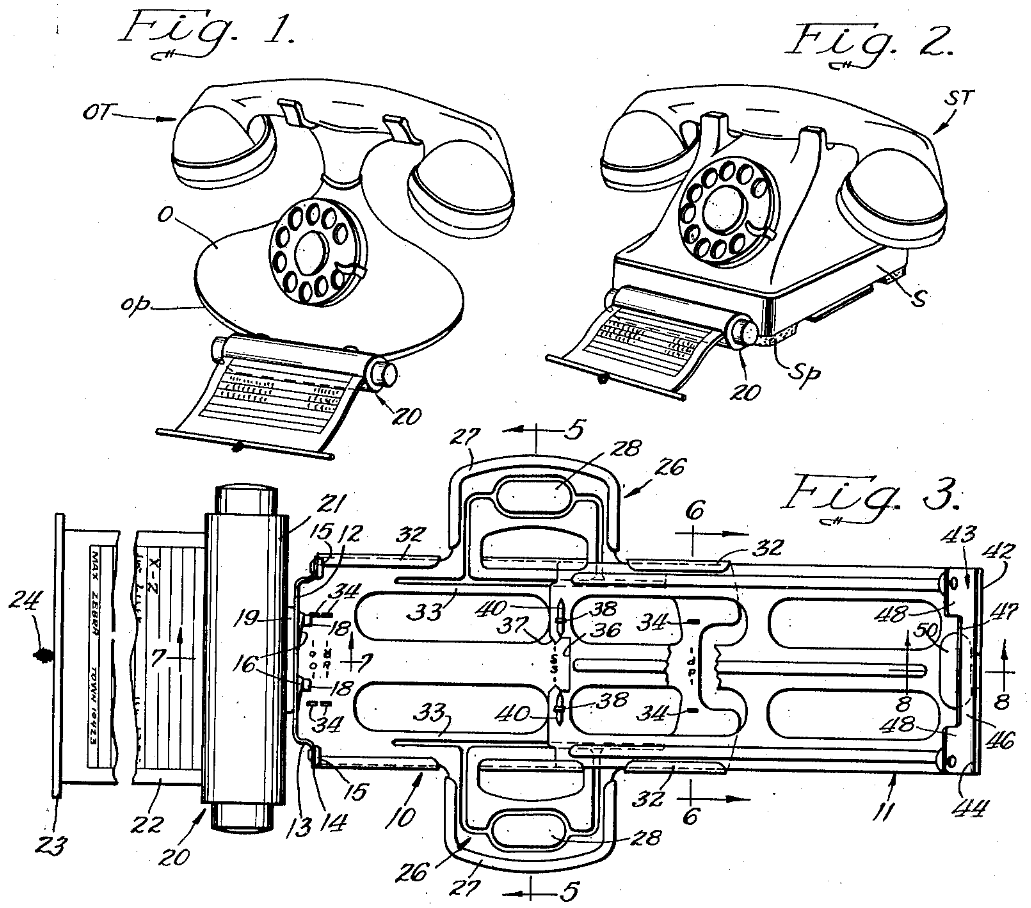
Figure 1 is a perspective view of a telephone instrument having an oval base, with the mounting frame of my invention applied thereto and a memoranda device mounted on the frame.
Figure 2 is a perspective view of a telephone having an oblong base, with the mounting frame of my invention applied thereto and carrying an index or memoranda attachment similar to that shown in Figure 1.
Figure 3 is a plan view, on an enlarged scale, of the mounting frame of my invention with an attachment, such as that shown in Figures 1 and 2, mounted thereon.
Figure 4:
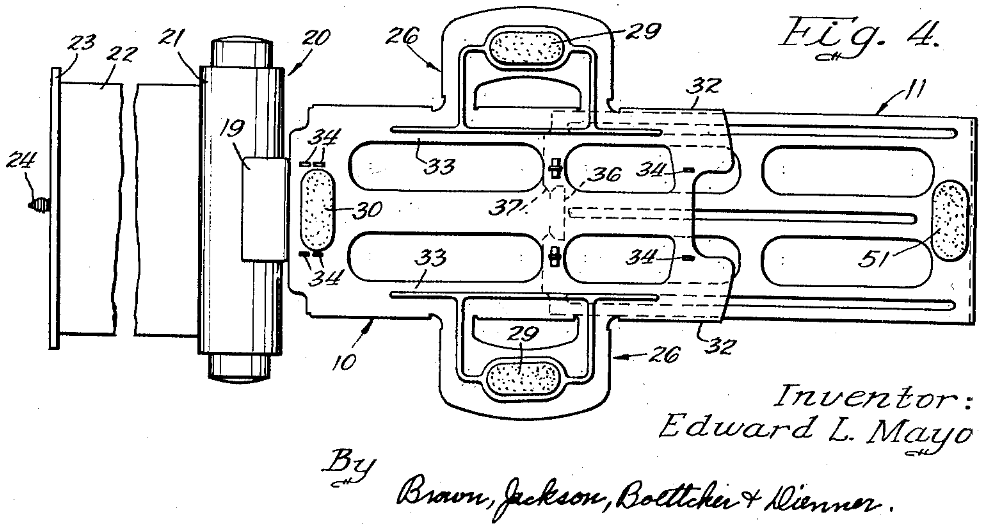
Figure 4 is an underneath view of the mounting frame and attachment shown in Figure 3.

In Figure 2 I have shown the mounting frame of my invention as applied to a telephone instrument ST having a rectangular or oblong base S provided, at each corner thereof, with a supporting pad *sp*. In applying the mounting frame of my invention to the base of the telephone of Figure 2, the frame members 10 and 11 are so adjusted that the slots 38 of frame member 11 are in register with the slots S of frame member 10, and the two frame members are then secured together by means of the fastening devices 40, as shown in Figures 3 and 4. The mounting frame is then properly adjusted for reception of the base S of the telephone ST. In applying the mounting frame, the base of the telephone instrument is inserted into the frame at a downward and rearward inclination, with its rear wall in contact with the bumpers 49, and is then forced rearward and downward into the frame, with the flange 12 extending upward along the front wall of the base and the bumpers 15 in contact with that wall. The frame structure as a whole is then forced upward into contact with the under face of the base of the telephone instrument, in which position it is held on the base by the spring clamping member 43, the forward arm 46 of which has then been displaced rearward a substantial distance, and the clamping elements 14 of flange 12, in cooperation with the bumpers 49 and 15. When the frame structure is thus properly positioned and secured upon the base S of the telephone, the supporting pads 29, 30 and 51 of the frame structure are disposed above the lower faces of the supporting pads *sp* of the telephone instrument, which latter pads continue to support the instrument upon the desk or table. In that connection, the arms 26 of frame member 10 are disposed a substantial distance rearward of flange 12, as previously noted, sufficiently to clear the supporting pads *sp* at the front of the base S of the telephone instrument ST, as will be clear from Figure 2, the arms 26 also being clear of the supporting pads at the rear corners of the base S, so that the telephone is then supported on the desk or table in the usual manner. The cord, extending from the back of the telephone instrument, then passes through central notch 52 provided in flange 42, and a registering notch 53 provided in arm 44 of the spring clamping member 43, for that purpose.

In order to apply the mounting frame to a telephone instrument having an oval base, the slots 38 of frame member 11 brought into register with the slots O of the frame member 10, and the two frame members are then secured together as before. The base O of the telephone instrument OT is then inserted into the mounting frame at a downward and rearward inclination and is then pushed downward into the mounted frame so as to seat therein. In a telephone having an oval base, a supporting pad *op* coextensive with the underface of the base is secured to the latter. Accordingly, this supporting pad *op* seats upon the upper face of the mounting frame and the pads 29, 30 and 51 of the latter then serve to support both the mounting frame and the telephone instrument mounted therein. As previously stated, and as will be noted more clearly from Figure 3, the clamp elements 14 and the bumpers 15 carried thereby are offset rearwardly from the flange 12 so as to accommodate between them the corresponding rounded or arcuate portion of the base O of the telephone instrument OT. Likewise, the spaced apart clamp elements 48 and the bumpers 49 carried thereby, of the spring clamping member 43, accommodate between them the corresponding rounded or arcuate portion of the telephone base O. Further, the inner arm 46 of the spring clamping member 43 extends upward and inward at an inclination over the base O of the telephone, which is conducive to secure attachment thereto of the mounting frame. In order to adapt the mounting frame to a telephone instrument having a round base, the slots 38 of frame member 11 are brought into register with the slots R of frame member 10, and the two frame members are then secured together. The round telephone base is then inserted into the mounting frame in the same manner as the oval telephone base, it being noted that the round telephone base usually is provided with a coextensive supporting pad so that, when the mounting frame is applied to a round telephone base, the pads 29, 30 and 51 serve to support both the frame and the telephone base mounted therein. The rearwardly extending supplementary flanges 13 resist forward displacement of the clamp elements 14, which is conducive to continued and firm gripping of the telephone base between the clamp elements of the mounting frame. When it is desired to apply the mounting frame to a telephone instrument provided with push buttons, the base of which is somewhat longer than the base of the telephone instrument ST of Figure 2, the slots 38 of frame member 11 are brought into register with the slots 34 designated P of frame member 10, and the two frame members are then secured together as before. The base of the push button telephone instrument is then inserted into the mounting frame in the same manner as the base of the telephone instrument ST of Figure 2. When the mounting frame is properly secured and positioned upon the base of the push button telephone instrument, the arms 26 of the mounting frame are disposed clear of the supporting pads of that instrument, in the same manner as in Figure 2, which is then supported upon the desk or table by its own supporting pads.

It will be seen that the mounting frame of my invention is adapted for use with telephone bases of various shapes and sizes, such as are presently in common use, avoids objectionable projections beyond the base of the telephone and provides simple and efficient means for mounting an attachment on the telephone base. It will be understood that changes in detail may be made without departing from the field and scope of my invention, and I intend to include all such variations, as fall within the scope of the appended claim, in this application in which the preferred form only of my invention has been disclosed.

I claim:

In a universal mounting frame for securement to the base of a telephone, a lower substantially oblong frame member provided at its forward end with an upwardly extending flange shaped at its side portions to provide rearwardly extending supplementary flanges and clamp elements of slight extent relative to said flange extending from said supplementary flanges toward the sides of said frame member, an upper substantially oblong frame member slidable on said lower member lengthwise thereof provided at its rearward end with clamp elements of reduced width spaced apart transversely thereof opposed to and yieldingly urged toward said clamp elements of said lower frame member, and means for securing said frame members together with said clamp elements thereof spaced a predetermined distance apart, said flange being provided with similarly directed rearwardly extending elements inclined toward one side thereof having keyhole slots therein for reception of the neck portions of headed attaching elements of a device to be mounted on said flange.

EDWARD L. MAYO.

REFERENCES CITED

The following references are of record in the file of this patent:

UNITED STATES PATENTS

| Number | Name | Date |
|---|---|---|
| 1,161,762 | Bartlett | Nov. 23, 1915 |
| 1,377,160 | Tiikkainen | May 3, 1921 |
| 1,425,550 | Spiro | Aug. 15, 1922 |
| 1,619,099 | Beck | Mar. 1, 1927 |
| 1,988,697 | Morris | Jan. 22, 1935 |
| 2,208,860 | Smart | July 23, 1940 |
| 2,350,075 | Smith et al. | May 30, 1944 |

FOREIGN PATENTS

| Number | Country | Date |
|---|---|---|
| 54,341 | Denmark | Feb. 1938 |
| 334,942 | Great Britain | of 1929 |